United States Patent Office

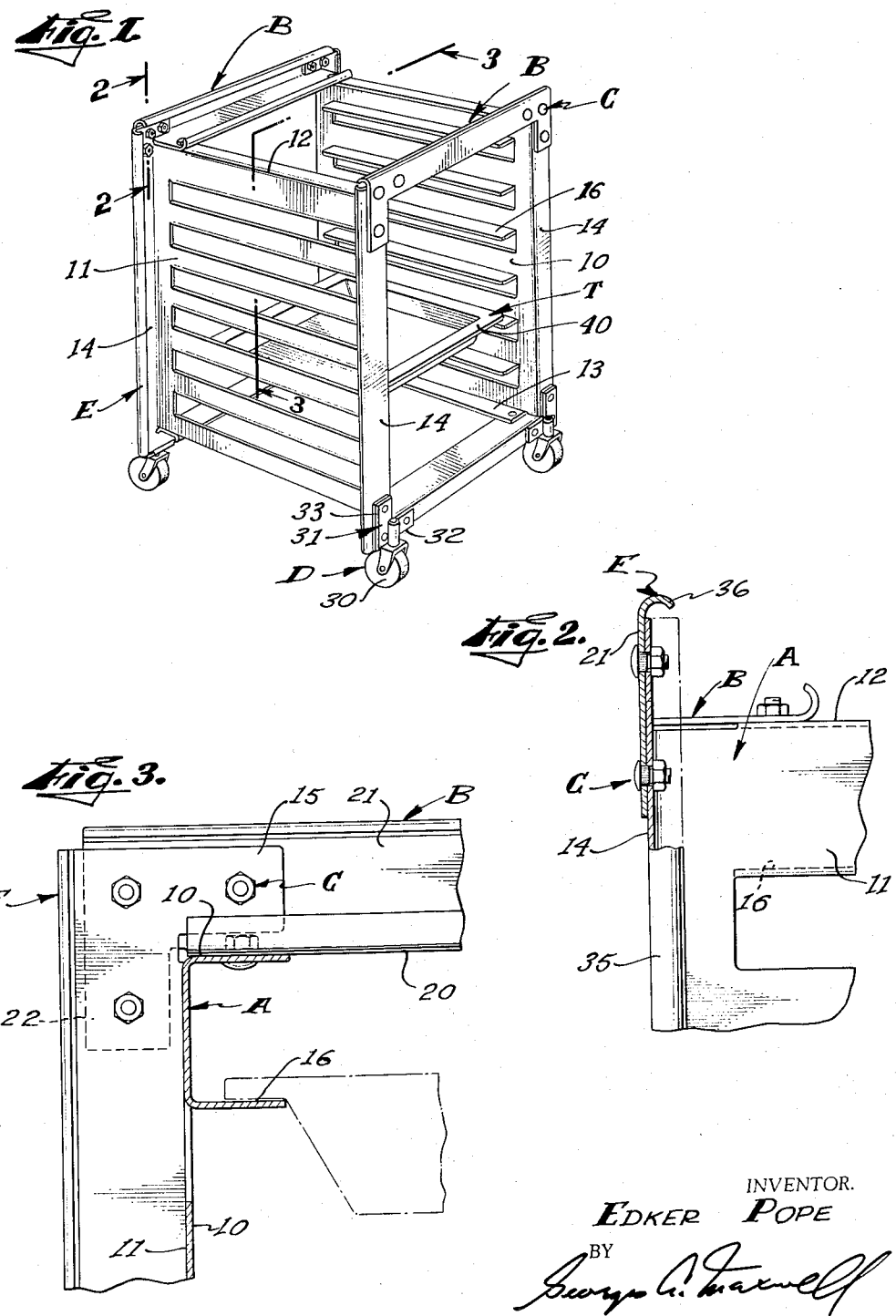

2,959,298
Patented Nov. 8, 1960

2,959,298

SANITARY TRAY RACK

Edker Pope, Pasadena, Calif.
(1527 E. 7th St., Los Angeles 21, Calif.)

Filed Apr. 22, 1957, Ser. No. 654,181

3 Claims. (Cl. 211—126)

This invention relates to a wheeled rack adapted to carry trays, or the like, and is more particularly concerned with a sanitary tray rack for use in bakeries and the like where foodstuff is to be handled.

It is common practice in bakeries and the like where food stuff is to be handled, to place the foodstuff on trays and to provide wheeled carts or tray racks to receive and carry the trays for transporting them from one location to another, or to store the trays with the foodstuff thereon when it is desired to age, proof or cure the foodstuff. The ordinary tray rack for the purpose referred to above is characterized by a box-like frame, caster wheels fixed to the four bottom corners of the frame, and a plurality of vertically spaced horizontally disposed rails formed of angle iron, fixed to opposite sides of the frame and adapted to receive lip-like peripheral flanges on the trays and to handle and support the trays within the confines of the frame.

In the ordinary tray rack construction as set forth above, the rails are secured to the frame by bolt-type screw fasteners and establish lapped joints where they join the frame, which joints are subject to collecting foodstuff which spills, splashes or is otherwise displaced from the trays and/or from other food handling operations and machines in the bakery. When the foodstuff lodges in the lap joints of the ordinary tray rack, it frequently decays or rots and thereby creates a serious sanitation problem. Due to the nature of the ordinary rack construction, cleaning the rack is extremely difficult and often times impossible, unless the entire construction is disassembled.

Due to the fact that the ordinary tray rack is difficult and requires considerable time to be properly cleaned and due to the fact that in the ordinary bakery, or the like, the tray racks are in constant use and cannot be spared out for a few minutes, the joints where the various parts of the ordinary tray rack are joined are quite frequently packed with decaying food which presents a definite, and of times, serious sanitation problem.

An object of the present invention is to provide an improved sanitary tray rack construction which is both easy and convenient to keep clean and sanitary.

Another object of the present invention is to provide a rack construction of the character referred to wherein no joints, or the like, occur in close proximity to the trays being handled and which might collect and carry contaminating matter.

A further object of my invention is to provide a rack construction of the character referred to that can be easily and quickly disassembled and assembled as circumstances require.

Another object of my invention is to provide a rack construction of the character referred to having means whereby the rack can be easily and conveniently engaged for the purpose of handling and moving the rack.

Still another object of my invention is to provide a tray rack construction which is both easy and economical of manufacture and which is both highly effective and dependable in operation.

A feature of the present invention is to provide a rack construction including two laterally spaced vertically disposed side panels with tray-engaging rails formed therein and spreaders fixed to and extending between the corners of the panel.

Another feature of my invention is to provide a construction of the general character referred to wherein each panel is provided with stiffening flanges along each vertical edge and to which the spreaders are secured.

Still another feature of the present invention is to provide finger-engaging lips on the flanges and the spreaders to facilitate handling the rack.

The various objects and features of my invention will be fully understood from the following detailed description of a typical preferred form and application of my invention, throughout which description reference is made to the accompanying drawings, in which:

Fig. 1 is a perspective view of the rack construction provided by the present invention.

Fig. 2 is an enlarged detailed sectional view of my rack construction taken as indicated by line 2—2 on Fig. 1.

Fig. 3 is an enlarged detailed sectional view of the rack provided by the present invention and taken as indicated by line 3—3 on Fig. 1.

The tray rack construction provided by the present invention and illustrated in the accompanying drawings is shown as including, generally, a pair of vertically disposed rectangular panels A, horizontally disposed spreaders B fixed to and extending between the corners of the panels, and supporting means D.

In addition to the foregoing, the rack that I provide is shown as further including, coupling means C connecting the spreaders B to the panels A, and finger-engaging means E on the panels and the spreaders to facilitate gripping and handling the rack.

The panels of the rack that I provide are alike and are formed of a single sheet of metal. Each panel is shown as having top, bottom and side edges and flat inner and outer faces 10 and 11. The top and bottom edges of each panel are turned inwardly at 90° to the plane of the panel to establish flat inwardly projecting horizontally disposed top and bottom flanges 12 and 13, while the side edges of each panel are turned outwardly at 90° to the plane of the panel to establish flat outwardly projecting vertically disposed side flanges 14, as clearly illustrated in the drawings.

The top and bottom end portions of the side flanges 14 projecting beyond the top and bottom flanges 12 and 13 and are provided with flat vertically disposed tongues 15 that occur in the same plane as the flanges 14 and projecting inwardly beyond the inner faces 10 of the panels.

Each panel is further provided with a plurality of flat, vertically spaced horizontally disposed, inwardly projecting flanges or flange-like rails 16. The rails 16 are established on the panel by piercing the panel and turning or bending the portion of the panel defined by the piercing operation, inwardly.

In the preferred carrying out of the invention and as illustrated throughout the drawings, the lines of piercing for each rail extend horizontally from one side portion to the other of the panel and turn upwardly at the ends. The portions of the panels defined by said lines of piercing are turned inwardly. With this relationship of parts, it will be apparent that the inner faces of the panels adjacent the rails continue upwardly from the rails and establish stops to prevent lateral shifting and/or displacement of trays engaged within the confines of the rack and supported on the rails.

In the preferred carrying out of the invention and as illustrated in the drawings, the rack is provided with four like spreaders B. The spreaders B are elongate horizontally disposed members of equal length and extend between and are releasably secured to the opposing four corners of the pair of panels A, to hold and maintain the panels in fixed spaced relationship to each other.

The spreaders B are shown as being formed of angle stock and each has a flat, horizontally disposed inner flange 20 adapted to occur adjacent the top or bottom flanges 12 or 13 of the panels A, and vertically disposed outer flanges 21, the end portions of which are adapted to occur adjacent the outer surface of the side flanges 14 of the panels A.

The horizontally disposed flanges 20 of the spreaders, at the upper or top end of the rack construction, occur and rest upon the top or upper side of the top flange 12 of the panels, while the flanges 20 of the spreaders at the lower or bottom end of the rack construction occur below and support the bottom flanges 13 of the panels.

In the preferred carrying out of the invention, and as illustrated throughout the drawings, the end portions of the horizontally disposed flanges 20 of the spreaders, which project beyond the vertical planes of the panels A, are cut and turned or bent so that they occur in the same plane as the vertical flanges 21 and establish tongues 22 which extend along and occur adjacent the outside surfaces of the side flanges 14 of the panels, as clearly illustrated in the drawings.

With the above relationship of parts and when the panels A and spreaders B are assembled, it will be apparent that the tonges 15 at the upper and lower ends of the side flanges 14 of the panels A occur adjacent and extend along the inside surfaces of the vertical flanges 21 of the spreaders B.

The coupling means C is adapted to releasably secure the panels A and spreaders B in rigid relationship to each other and is shown as including, a plurality of bolt-type screw fasteners 25 engaged in registering openings in the panel and spreader elements A and B.

In the case illustrated, I have shown a pair of registering openings 26 at the ends of the flanges 14 and 21 of the panels and spreaders and through which screw fasteners 25 are engaged, and a pair of registering openings 26 in the end portion of each tongue 15 and 22 and the flange 14 or 21 to which said tongues are related and through which screw fasteners 25 are engaged.

With the above relationship of parts, it will be apparent that the spreaders B and panels A are secured together to form a rigid structure. It will be further apparent that the tongues 15 and 22 on the panels and spreaders, stiffen and reinforce the corner constructions of the rack and prevent the rack from working and/or racking when the construction is in use.

The supporting means D that I provide is shown as including caster wheels 30 at the four lower or bottom corners of the rack construction. The caster wheels 30 can be of any suitable construction and are shown secured to the construction by suitable angle or L-shaped corner plates 31. The L-shaped corner plates for the caster wheel constructions 30 have horizontally disposed bottom legs 32 and which extend along the outer surface of the side flanges on the lower spreaders B and having upwardly projecting legs 33 which extend along and are preferably coextensive with the upwardly projecting tongues 22 of the lower spreaders B. The plates 31 are provided with suitable apertures or openings which register with the openings 26 in the panels and the spreaders and through which the screw fasteners 25 of the coupling means C at the lower corners of the rack extend.

With the above relationship of parts, it will be apparent that the fastener means C suitably secures the plates 31 of the supporting means to the rack. It will be further apparent that the L-shaped angle plates 31 serve to further stiffen the lower corner constructions of the rack.

It is to be understood that the particular supporting means D illustrated throughout the drawings is only illustrative of one type of supporting means that could be employed and does not materially effect the novelty of the present invention. In practice, and if circumstances require, the supporting means D could be eliminated altogether or could include simple, vertically disposed legs, or the like.

The finger-engaging means E provided by the present invention is shown as including simple rounded or recurvent lip-like extensions 35 and 36 on the flanges 14 and 21 of the panels A and spreaders B. The lips 35 and 36 are curved about a radius of sufficient extent so as to comfortably and conveniently receive the finger tips of a person's hands and are turned inwardly so that they establish rounded corners about the rack construction in a manner to eliminate any sharp or dangerous corners on the rack construction.

With the above relationship of parts, it will be apparent that the lips 35 and 36 can be easily and conveniently engaged by a person's fingers, and eliminates the necessity of the person handling or manipulating the rack from engaging and gripping a portion of the rack as is required in the ordinary rack construction.

The lips 35 and 36 serve to further stiffen and make the resulting or overall rack construction more rigid.

In Fig. 1 of the drawings, I have shown a tray T engaged in my rack construction. The tray T is shown as including or being provided with a peripheral flange 40, which flange is shown engaged on a pair of rails 16 on the panels A of the rack to be supported thereby, within the confines of the rack.

With the construction set forth above, it will be apparent that I have provided a novel, sanitary tray rack construction involving a minimum number of parts and a construction which can be easily and conveniently cleaned. It will also be apparent that I have provided a tray rack construction which is both easy and economical of manufacture and which is both highly effective and dependable in operation.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A sanitary tray rack construction including, a pair of like vertically disposed, rectangular panels, each having inner and outer surfaces, inwardly projecting horizontal flanges along its top and bottom edges, elongate outwardly projecting vertical flanges along its vertical side edges and having end portions projecting beyond the top and bottom horizontal flanges and a plurality of vertically spaced horizontally disposed slot-like openings, tray supporting rails formed therein to project from the inner surface thereof adjacent the top edges of the slots, and elongate horizontally disposed spreaders fixed to and extending between the end portions of the vertical flanges of the panels and the end portions of the adjacent top and bottom horizontal flanges of the panels to maintain the panels in fixed spaced relationship with each other and with the inner surfaces thereof in opposed relationship said rails being established by the stock shifted from plane of the panels to establish the openings.

2. A sanitary tray rack construction including, a pair of like vertically disposed, rectangular panels, each having inner and outer surfaces, inwardly projecting horizontal flanges along its top and bottom edges, outwardly projecting vertical flanges along its vertical side edges and having end portions projecting beyond the top and bottom edges of the panel and a plurality of vertically spaced horizontally disposed slot-like openings, tray supporting rails formed therein to project from the inner surface thereof adjacent the top edges of the slots, and elongate horizontally disposed spreaders extending between the corners of the panels and having horizontally disposed longitudinal flanges, the ends of which occur adjacent and lap the inwardly projecting flanges on the panels and vertically disposed, longitudinal flanges, the ends of which occur adjacent and lap the side flanges of the panels, and screw fasteners engaged through said adjacent portion of the panels and spreaders to secure said panels and spreaders in rigid relationship with each other said rails being established by the stock shifted from the plane of the panels to establish the openings, said vertical flanges having recurrent lips along their outer edges to establish rounded vertical corner edges on the rack and providing finger engaging members.

3. A sanitary tray rack construction including, a pair of like vertically disposed, rectangular panels, each having inner and outer surfaces, inwardly projecting flanges along its top and bottom edges, inwardly turned finger engaging lips along the top edges of said flanges, outwardly projecting flanges along its vertical side edges and projecting beyond the top and bottom flanges, inwardly turned finger engaging lips along the outer edges of said flanges, a plurality of elongate vertically spaced horizontally disposed slots in the panel, an elongate, flat, horizontally disposed tray supporting rails formed by the stock left by said slots to project from the inner surface of the panel adjacent the top edges of the slots, and elongate horizontally disposed spreaders extending between the corners of the panels and having horizontally disposed longitudinal flanges, the ends of which occur adjacent the inwardly projecting flanges on the panels and vertically disposed, longitudinal flanges, the ends of which project beyond the horizontally disposed flanges to occur adjacent the side flanges of the panels, laterally inwardly projecting tongues at the end portions of the side flanges of the panels to occur adjacent the inner surfaces of the vertical flanges of the spreaders and vertically disposed tongues at the ends of the vertical flanges of the spreaders to occur adjacent the outer surface of the side flanges of the panels, and screw fasteners engaged through the tongues and said adjacent portion of the panels and spreaders to secure said panels and spreaders in rigid relationship with each other.

References Cited in the file of this patent

UNITED STATES PATENTS

| | | |
|---|---|---|
| 2,150,743 | Mancuso | Mar. 14, 1939 |
| 2,336,802 | Posner | Dec. 14, 1943 |
| 2,478,458 | Carter | Aug. 9, 1949 |
| 2,574,692 | Davidson | Nov. 13, 1951 |
| 2,647,523 | Vollender | Aug. 4, 1953 |

FOREIGN PATENTS

| | | |
|---|---|---|
| 1,122,753 | France | May 28, 1956 |